No. 12,702. REISSUED OCT. 15, 1907.
C. GIBBS.
TYPE WRITER.
APPLICATION FILED JUNE 29, 1907.
Fig. 1.
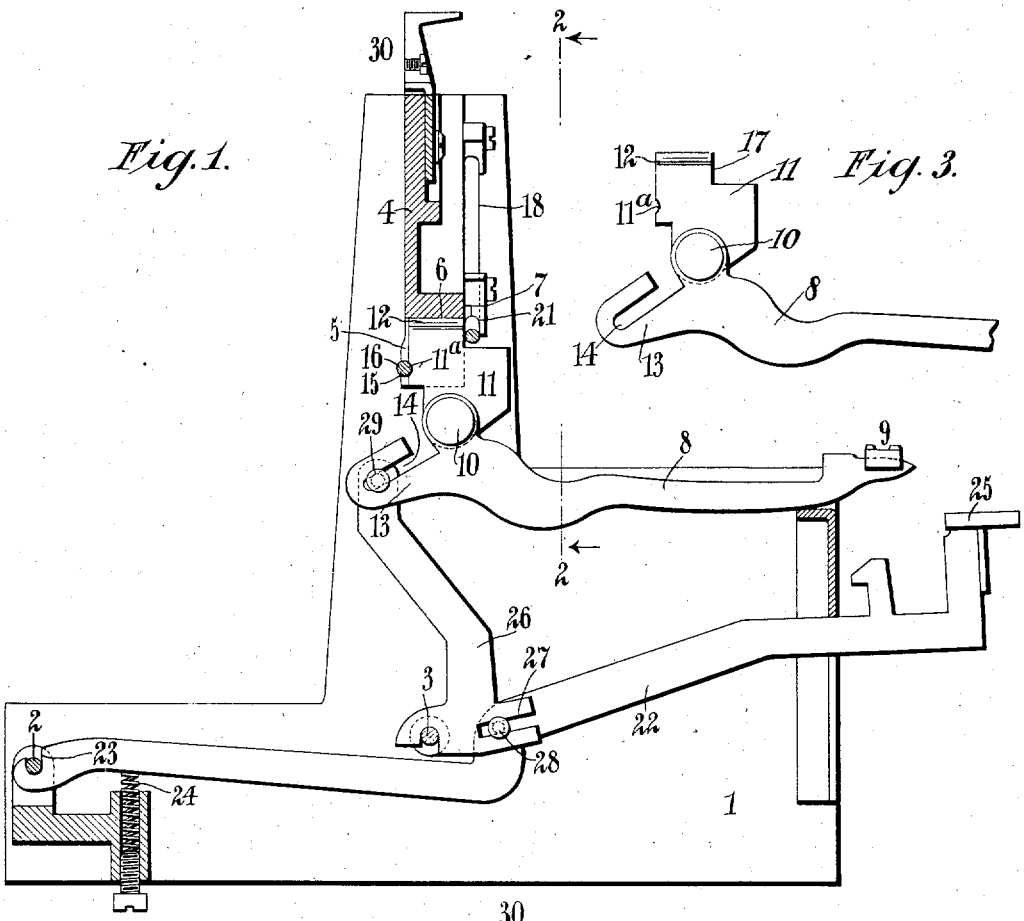
Fig. 3.
Fig. 2.
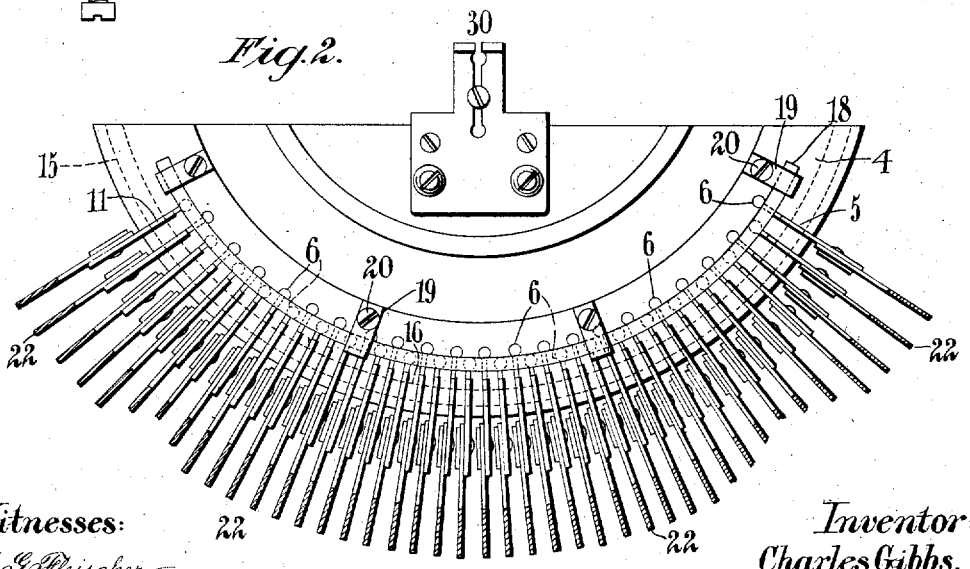
Witnesses:
H. G. Fleischer
John O. Seifert.
Inventor:
Charles Gibbs.
By his Attorney,
B. Stickney

UNITED STATES PATENT OFFICE.

CHARLES GIBBS, OF NEW YORK, N. Y., ASSIGNOR TO UNDERWOOD TYPEWRITER COMPANY, OF NEW YORK, N. Y., A CORPORATION OF NEW JERSEY.

TYPE-WRITER.

No. 12,702. Specification of Reissued Letters Patent. Reissued Oct. 15, 1907.

Original No. 854,484, dated May 21, 1907, Serial No. 361,233. Application for reissue filed June 29, 1907. Serial No. 381,579.

*To all whom it may concern:*

Be it known that I, CHARLES GIBBS, a citizen of the United States, and a resident of the city of New York, borough of Bronx, in the county and State of New York, have invented a new and Improved Type-Writer, of which the following is a full, clear, and exact description.

This invention relates to typewriters, and especially to that type of these machines which employs type bars. The object of the invention is to produce an improved arrangement which will facilitate the renewal of the type bars when they become worn.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a vertical section showing some of the parts of a typewriter and illustrating the invention; Fig. 2 shows the upper portion of the mechanism of Fig. 1, in elevation; this view may be considered as a section on the line 2—2 of Fig. 1; and Fig. 3 is a side elevation showing a portion of a type bar when constructed according to the present invention.

Referring more particularly to the parts, 1 represents the end plate of the frame of a typewriter, there being a similar plate at the opposite end of the case. These end plates are connected near the rear of the machine by a lever bridge 2, which consists simply of a horizontal transverse bar as shown. A similar transverse bar 3 is provided connecting the end plates 1 near the middle of the case, and this bar constitutes a rocker bridge. In the upper portion of the mechanism between the end plates 1, I provide a segment 4 consisting of a plate of substantially semi-circular form, as indicated in Fig. 2. At its lower edge this plate or segment is provided with a plurality of slots or sockets 5 which are disposed radially from the center of the arc upon which the lower edge of the segment is disposed. At their upper extremities these slots are formed with enlargements or round grooves 6 which extend inwardly from the forward vertical face 7 of the segment.

Each of the type bars 8 is substantially of the form shown, presenting an elongated body, near the free end of which the type bar 9 is attached. At the point 10 each type bar is pivotally attached to a shoe or hanger 11. This part consists simply of a thin plate presenting, at its upper edge, an enlarged bead or tongue 12. The bar is pivoted to the plate near the lower edge thereof, as shown in Fig. 3. The type bar is provided with a rearwardly extending toe 13, presenting a slot 14 for a purpose which will appear more fully hereinafter. These hangers 11 are removably mounted in the slots 5 in the manner indicated. The bodies of the plates are of substantially the width of the slots so that they fit neatly therein. The tongues 12 are received in the enlargements or grooves 6 so as to interlock the hangers in the slot and prevent the hangers from being displaced downwardly in the slots. As shown in Fig. 1, the slots 5 are cut completely through the rear face of the segment; on its rear face the segment 4 is formed with a groove 15 which is curved to conform to the shape of the segment; this groove is undercut on both sides, as shown, so that it will retain a curved seat-bar 16 which is thrust in through the open end of the groove. This bar closes the bottoms of the slots and forms a seat for the hangers to come against when they are shoved into the slots or sockets. The inner vertical edges of the hangers are provided with notches 11ª respectively in which the seat-bar 16 lies. The upper portions of the hangers 11 are cut away, as indicated at the edges 17 so that these edges 17 are in substantial alinement with the forward face 7 of the segment. The bodies of the hangers project beyond this point so as to enable them to be seized when they are to be removed. They are held in the slots by means of a lock bar 18, which lock bar is of curved form, as indicated in Fig. 2; it is held against the edges 17 of the hangers by means of small clips or clamps 19 which are fastened to the outer face of the segment by suitable screws 20. These clamps are cut as indicated in Fig. 1 so as to present sockets 21 on their lower faces which engage the outer side of the bar.

Movement is given to each type bar by means of a key-lever 22, which is formed at its rear extremity with a hook 23 engaging the under side of the bridge 2. Near the bridge 2 a spring 24 is provided, which thrusts against the under side of the lever and maintains the same in an elevated position. The forward end of the lever projects from the typewriter case in the usual manner, and is provided with a button 25 which indicates the character of the type operated by that key. On the bridge 3 a rocker 26 is provided, which is formed at one side with a slot 27, and this slot is engaged by a pin 28 carried by the lever 22 as shown. This rocker 26 extends upwardly, and is provided at its upper extremity with a pin 29 which is received in the aforesaid slot 14. From the arrangement described, and illustrated in Fig. 1, it should be understood that when the lever 22 is depressed, the upper portion of the rocker 26 will move toward the right in such a way as to elevate the free end of the type bar 8. In this way any one of the type bars may be operated so as to bring the type to the printing point 30 where the impression of the type is taken.

Whenever it is necessary to remove one of the type bars to repair or renew the part, this is readily accomplished by loosening the clamps 19 in such a way as to enable the lock bar 18 to be shifted longitudinally in the clamps. The lock bar is, of course, shifted far enough to uncover the hanger of the type bar which is to be removed, whereupon the hanger is simply slid forwardly out of its slot, and the toe 13 of the type bar is then disengaged from the pin 29. The new type bar is then attached to the pin 29, as will be readily understood, and its hanger is then forced rearwardly into the slot so as to occupy the position occupied by the hanger of the original type bar. The lock bar 18 is then slid back into its normal position, and secured by tightening the clamps 19 in the manner suggested.

Attention is called to the simplicity of the operation of renewing the type bar when the parts are constructed according to this invention. It is unnecessary to remove any of the contiguous parts except the lock bar 18, and this bar even is not removed, but simply displaced slightly from its normal position.

Having thus described my invention, I claim as new and desire to secure by Letters Patent:

1. In a machine of the class described, in combination, a segment having sockets in the edge thereof, a plurality of hangers sliding respectively into said sockets interlocking therewith and projecting beyond the edge of said segment, and type bars pivotally attached to the projecting parts of said hangers beyond said edge.

2. In a machine of the class described, in combination, a vertically disposed segment having radially disposed slots in the edge thereof, a plurality of hangers sliding horizontally into said slots, an interlocking connection between said hangers and said slots preventing a radial movement thereof in said slots, said hangers projecting beyond the edge of said segment, and type bars pivotally attached to said hangers on the projecting parts thereof.

3. In a machine of the class described, in combination, a fixed member having a plurality of slots, said slots having grooves therein, a plurality of hangers received in said slots and having tongues adapted to slide into said grooves, and a plurality of type bars respectively pivoted on said hangers.

4. In a machine of the class described, in combination, a segment having a plurality of slots with grooves therein, a plurality of hangers received respectively in said slots and having tongues received in said grooves, a curved lock bar removably attached to said segment adjacent to said hangers and locking the same against withdrawal, and a plurality of type bars pivotally mounted respectively on said hangers.

5. The combination of a segment having sockets in its outer or circumferential edge, hangers removably fitted in said sockets, and fanning outwardly from said edge, a bar attached to the segment and locking the hangers to the sockets, and type bars pivoted to portions of the hangers which project from the sockets, the segment lying between the type-bar pivots and the printing point.

6. The combination of a segment having sockets in its outer or circumferential edge, hangers fitted in said sockets and having portions fanning radially outward from said curved edge of the segment, and type bars pivoted to said projecting portions of the hangers, the segment lying between the type-bar pivots and the printing point.

7. The combination of a segment having radial slots at its edge, said slots cut completely through the segment, hangers in the form of thin plates fitted in said slots, seats upon the segment for said hangers, means pressing said hangers against the seats, and type bars pivoted to portions of the hangers which project from the slots.

8. The combination of a segment having radial slots at its edge, said slots cut completely through the segment, hangers in the form of thin plates fitted in said slots, seats for said hangers upon the rear side of said segment, releasable means upon the front of the segment pressing said hangers against the seats, and type bars pivoted to portions of the hangers which project from the slots.

9. The combination of a segment having radial slots, hangers in the form of thin plates fitted in said slots, seats provided within said slots, said hangers being notched to fit said seats, means to press the hangers against the seats, and type bars pivoted upon said plates outside of said slots.

10. The combination of a type bar and a hanger pivoted thereto, the hanger being in the form of a thin plate to fit in a radial slot in a segment, and having an enlarged bead or tongue to fit in a groove in the segment, to interlock the hanger with the segment.

11. A type-bar hanger in the form of a thin flat plate to fit in a radial slot of a segment and notched to fit a hanger seat and having a pivot portion to project from said slot, and also having a projecting handle.

12. A type-bar segment having along its outer or curved edge radial slots which extend completely through the segment, each slot having a groove to interlock with a plate hanger to be inserted in the slot, and provided with seats for the hangers, and also provided with means to press the hangers releasably against the seats.

13. A type-bar segment having along its outer or curved edge radial slots, each slot having a groove to interlock with a plate hanger to be inserted in the segment.

14. A type-bar segment having along its outer or curved edge radial slots, each slot having a groove to interlock with a plate hanger to be inserted in the segment, and provided with seats for the hangers.

15. A type-bar hanger in the form of a thin flat plate to fit in a radial slot of a segment and having an enlarged bead or tongue to fit in a groove in the slot, and also having a pivot portion to project from said slot.

16. A segment having radially disposed slots in its outer or curved edge, said slots extending completely through the segment and being alternately long and short, each slot having an enlargement or groove at its inner end.

17. A segment having radially disposed slots in its outer or curved edge, said slots extending completely through the segment and being alternately long and short, each slot having an enlargement or groove at its inner end, in combination with hangers in the form of thin plates fitted in said slots and having beads to fit in said grooves; and type-bars pivoted to portions of said hangers projecting from said slots.

18. The combination of a segment having radially disposed slots in its outer or curved edge, said slots extending completely through the segment and being alternately long and short, each slot having an enlargement or groove at its inner end, and type bar hangers in the form of thin plates fitted in said slots and having beads to fit in said grooves; said hangers being alternately long and short to correspond with the lengths of the slots, and type bars pivoted to portions of said hangers projecting from said slots.

19. The combination of a segment having radially disposed slots in its outer or curved edge, said slots extending completely through the segment and being alternately long and short, each slot having an enlargement or groove at its inner end, and hangers in the form of thin plates fitted in said slots and having beads to fit in said grooves; said hangers being alternately long and short to correspond with the lengths of the slots, and type bars pivoted in a single arc to projecting portions of said hangers.

20. The combination of a segment provided with radial slots having enlargements or grooves, hangers in the form of thin plates having at their upper or inner edges enlarged beads or tongues to interlock with said grooves, and type bars pivoted to portions of said hangers which project from said slots.

21. The combination of a segment provided with radial slots having enlargements or grooves, hangers in the form of thin plates having at their upper or inner edges enlarged beads or tongues to interlock with said grooves, and type bars pivoted to portions of said hangers which project from said slots; said segment being formed on its rear face with a groove in which is retained a curved bar which closes the slots and forms a seat for the hangers, said hangers being provided with notches to fit upon said seat bar.

22. The combination of a segment provided with radial slots having enlargements or grooves, hangers in the form of thin plates having at their upper or inner edges enlarged beads or tongues to interlock with said grooves, and type bars pivoted to portions of said hangers which project from said slots; said segment being formed on its rear face with a groove in which is retained a curved bar which closes the slots and forms a seat for the hangers, said hangers being provided with notches to fit upon said seat bar, the upper portions of the hangers being cut away so that they are about in alinement with the forward face of the segment, the bodies of the hangers projecting beyond the forward face of the segment to enable them to be seized when they are to be removed, and a curved locking bar held against the edges of the hangers by means of clamps.

23. The combination of a segment provided with radial slots, hangers in the form of thin plates fitted in said grooves, and type bars pivoted to portions of said hangers which project from said slots; said segment being formed on its rear face with a groove in which is retained a curved seat bar which closes the bottoms of the slots and forms a seat for the hangers.

24. The combination of a segment provided with radial slots, hangers in the form of thin plates fitted in said grooves, and type bars pivoted to portions of said hangers which project from said slots; said segment being formed on its rear face with a groove in which is retained a curved seat bar which closes the bottoms of the slots and forms a seat for the hangers, the upper portions of the hangers being cut away so that they are about in alinement with the forward face of the segment, and the bodies of the hangers projecting beyond the forward face of the segment to enable them to be seized when they are to be removed.

CHARLES GIBBS.

Witnesses:
JOHN O. SEIFERT,
C. RIPLEY.